US008525967B2

United States Patent
Ito et al.

(10) Patent No.: US 8,525,967 B2
(45) Date of Patent: Sep. 3, 2013

(54) PROCESS FOR PRODUCING LIQUID CRYSTAL DISPLAY DEVICE AND LIQUID CRYSTAL DISPLAY DEVICE

(71) Applicant: Asahi Glass Company, Ltd., Tokyo (JP)

(72) Inventors: Hiroshige Ito, Tokyo (JP); Satoshi Niiyama, Chiyoda-Ku (JP); Hitoshi Tsushima, Chiyoda-ku (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 13/718,047

(22) Filed: Dec. 18, 2012

(65) Prior Publication Data

US 2013/0128213 A1 May 23, 2013

Related U.S. Application Data

(63) Continuation of application No. 12/436,825, filed on May 7, 2009, now Pat. No. 8,373,839, which is a continuation of application No. PCT/JP2007/071835, filed on Nov. 9, 2007.

(30) Foreign Application Priority Data

Nov. 10, 2006 (JP) .................................. 2006-305361

(51) Int. Cl.
*G02F 1/1339* (2006.01)
(52) U.S. Cl.
USPC ............................................. 349/153; 349/86
(58) Field of Classification Search
USPC .................... 349/153, 190, 138, 122, 86, 178
See application file for complete search history.

(56) References Cited

U.S. PATENT DOCUMENTS

| | | | |
|---|---|---|---|
| 6,831,725 B2 * | 12/2004 | Niiya | 349/153 |
| 6,847,428 B1 | 1/2005 | Sekiguchi et al. | |

(Continued)

FOREIGN PATENT DOCUMENTS

| | | |
|---|---|---|
| EP | 0 053 834 A2 | 9/1992 |
| EP | 0 053 834 A3 | 9/1992 |

(Continued)

OTHER PUBLICATIONS

Office Action as received in the corresponding Japanese Patent Application No. 2008-543148 dated May 8, 2012 (English Translation only).

*Primary Examiner* — Thoi Duong
(74) *Attorney, Agent, or Firm* — Oblon, Spivak, McClelland, Maier & Neustadt, L.L.P.

(57) ABSTRACT

A process for producing a liquid crystal display device enabling to produce with simple process, and such a liquid crystal display device, are provided.
A process for producing a liquid crystal display device comprising: a step of forming transparent electrodes (41, 42) on first and second substrates (11, 12); a step of applying an uncured raw seal material; a step of dropping a first functional material; a step of dropping a second functional material; a step of sandwiching the raw seal material (13*a*, 14*a*), the first functional material (32*a*) and the second functional material (31*a*) between the first and second substrates under a predetermined reduced pressure atmosphere, and thereby forming a sealed product wherein the first functional material is isolated from the second functional material by the raw seal material and sealed between the first and the second substrates; a step of exposing the sealed product to a normal atmospheric pressure; and a step of curing at least the raw seal material.

7 Claims, 9 Drawing Sheets

(56) References Cited

U.S. PATENT DOCUMENTS

| | | | |
|---|---|---|---|
| 7,295,280 | B2 | 11/2007 | Liou |
| 7,362,404 | B2 | 4/2008 | Tadaki et al. |
| 2004/0105053 | A1 | 6/2004 | Ozeki et al. |

FOREIGN PATENT DOCUMENTS

| | | |
|---|---|---|
| EP | 0 503 834 A2 | 9/1992 |
| EP | 0 503 834 A3 | 9/1992 |
| JP | 62-16931 | 1/1987 |
| JP | 62-142025 | 9/1987 |
| JP | 64-19918 | 1/1989 |
| JP | 5-265012 | 10/1993 |
| JP | 9-080449 | 3/1997 |
| JP | 2001-255514 | 9/2001 |
| JP | 2001-264777 | 9/2001 |
| JP | 2002-098978 | 4/2002 |
| JP | 2004-107450 | 4/2004 |
| JP | 2004-131335 | 4/2004 |
| JP | 2005-024520 | 1/2005 |
| JP | 2005-128517 | 5/2005 |
| JP | 2005-134905 | 5/2005 |
| JP | 2006-178323 | 7/2006 |
| WO | 00/79338 | 12/2000 |

* cited by examiner

Fig. 5
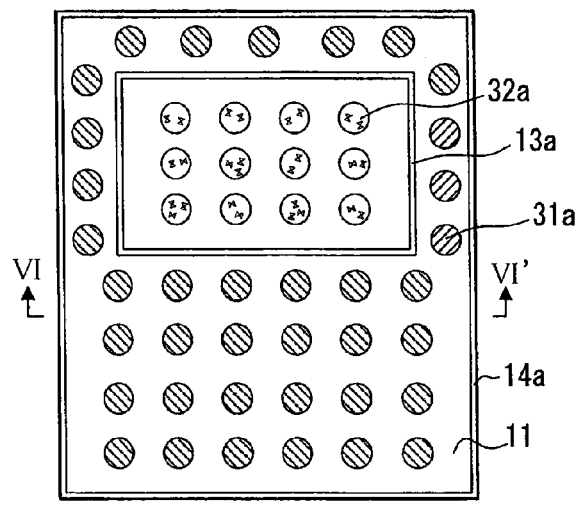
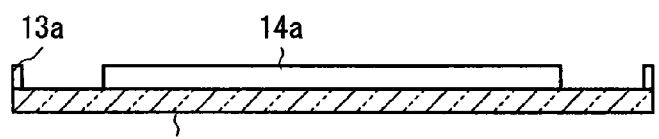
Fig. 6(a)
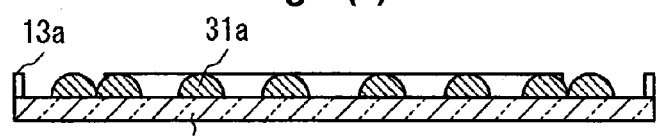
Fig. 6(b)
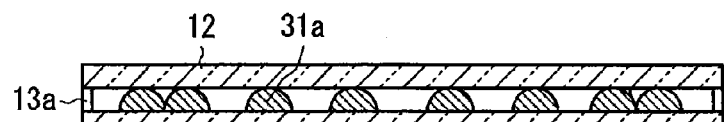
Fig. 6(c)
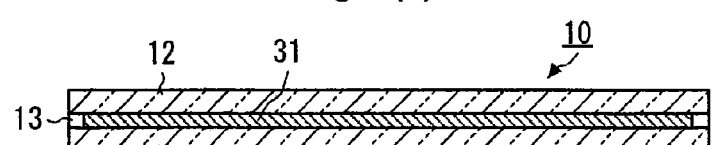
Fig. 6(d)

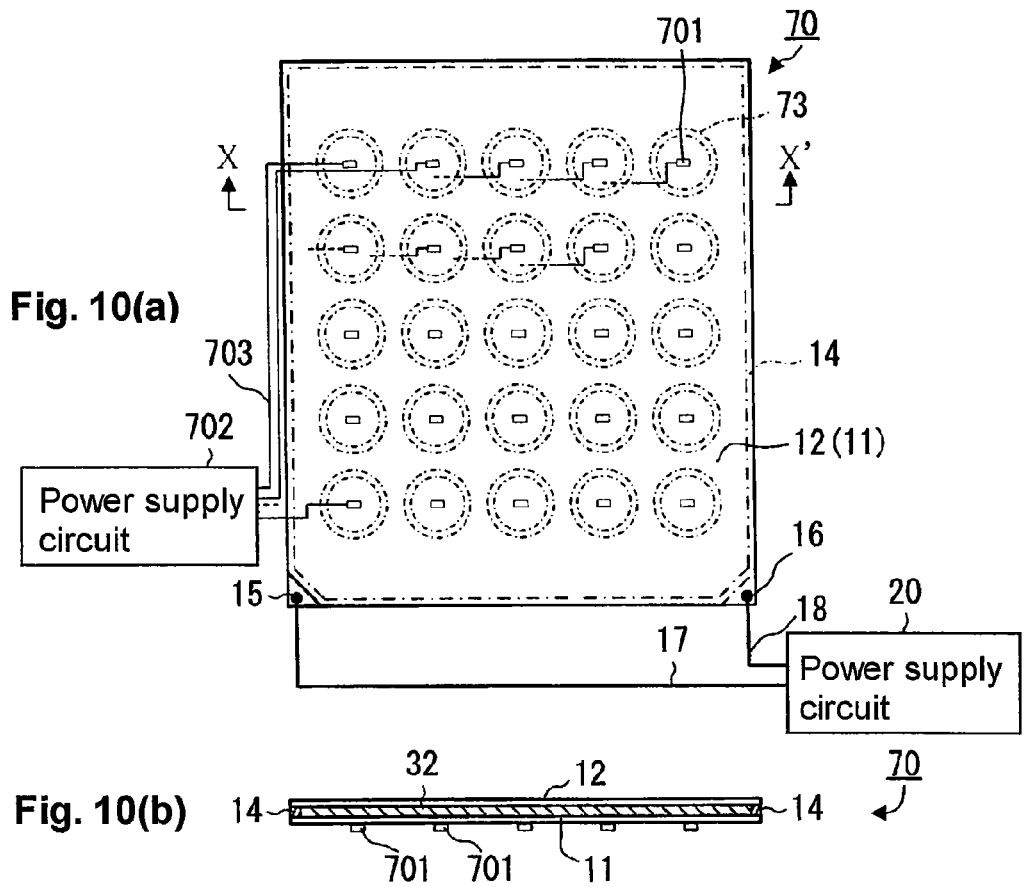
Fig. 10(a)
Fig. 10(b)
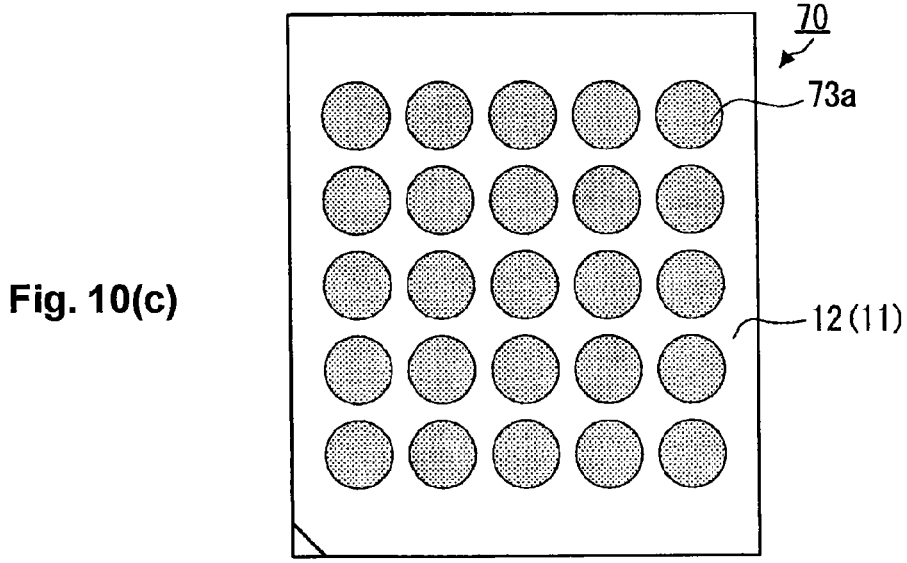
Fig. 10(c)

PROCESS FOR PRODUCING LIQUID CRYSTAL DISPLAY DEVICE AND LIQUID CRYSTAL DISPLAY DEVICE

CROSS-REFERENCE TO RELATED APPLICATIONS

This application is a continuation of U.S. Ser. No. 12/436,825 filed May 7, 2009, now U.S. Pat. No. 8,373,839, which was a National Stage of PCT/JP07/071835 filed Nov. 9, 2007.

TECHNICAL FIELD

The present invention relates to a process for producing liquid crystal display device and to a liquid crystal display device, in particular, to a process for producing a liquid crystal display device having a light-control function or a display function only in a partial area on a transparent substrate and to such a liquid crystal display device.

BACKGROUND ART

Heretofore, a technique of sandwiching a liquid crystal panel together with a transparent resin between two glass substrates, to form a light-control window of laminated glass structure, has been proposed (refer to Patent Document 1). By employing this technique, it is possible to provide light-control function only to a part of the glass substrate by embedding a small-sized liquid crystal panel between two glass substrates.

Patent Document 1: JP-A-2004-131335

DISCLOSURE OF THE INVENTION

Problems to be Solved by the Invention

However, there is a limit in thickness reduction of liquid crystal panel, and it has not been easy to reduce the thickness of a light-control window produced by the above technique. Further, since a step of producing a liquid crystal panel and a step of sandwiching the panel together with a transparent resin between two glass substrates are required, there has been a problem that production process is complicated. Further, there has also been a problem that it is difficult to lead out wirings from the liquid crystal panel to an edge of a glass substrate.

In order to solve these problems, it is an object of the present invention to provide a process for producing a liquid crystal display device having more simple structure than those of conventional devices, produceable by simple process and provided with light-control function only in a partial area on a substrate; and to provide such a liquid crystal display device.

Means for Solving the Problem

The present invention provides a process for producing a liquid crystal display device comprising: a step of forming transparent electrodes on first and second substrates; a step of applying an uncured raw seal material to at least one of the first and second substrates; a step of dropping a first functional material containing liquid crystal on at least one of the first and second substrates; a step of dropping a second functional material containing no liquid crystal on at least one of the first and second substrates; a step of sandwiching the raw seal material, the first functional material and the second functional material between the first and second substrates under a predetermined reduced pressure atmosphere, and thereby forming a sealed product wherein the first functional material is isolated from the second functional material by the raw seal material and sealed between the first and second substrates; a step of exposing the sealed product to a normal atmospheric pressure; and a step of curing at least the raw seal material.

Further, in an embodiment of the process for producing a liquid crystal display device of the present invention, the first functional material comprises a composite of liquid crystal and curable compound, or a liquid crystal, and the second functional material comprises a transparent or a colored resin. Further, in an embodiment of the process for producing a liquid crystal display device according to the present invention, the composite and the seal material each has a visible light transmittance of at least 70% in a transparent state. Further, in an embodiment of the process for producing a liquid crystal display device according to the present invention, the raw seal material comprises a polyene-polythiol system polymer. Further, in an embodiment of the process for producing a liquid crystal display device according to the present invention, the absolute value of the difference between the haze value of the seal material and the haze value of the composite in a transparent state, is at most 3%. Further, an embodiment of the process for producing a liquid crystal display device according to the present invention, further comprises a step of cutting the first and the second substrates in a region different from a region wherein the first functional material is sealed. Further, an embodiment of the process for producing a liquid crystal display device according to the present invention, further comprises a step of forming a through hole perforated through the first and second substrates in a region different from a region wherein the first functional material is sealed.

Further, the present invention provides a liquid crystal display device comprising first and second substrates that are disposed so as to oppose to each other and each having a transparent electrode; a first seal material for forming a first space between these substrates; a second seal material for forming a second space between the first and second substrates; a first functional layer provided in the first space; and a second functional layer provided in the second space; wherein the first functional layer comprises a composite layer containing liquid crystal and cured product, and the composite and the seal material each has a visible light transmittance of at least 70% in a transparent state. In an embodiment of the liquid crystal display device according to the present invention, the seal material comprises a polyene-polythiol system polymer. In an embodiment of the liquid crystal display device according to the present invention, the absolute value of the difference between the haze value of the seal material and the haze value of the composite in a transparent state is at most 3%.

Effect of the Invention

The liquid crystal display device according to the present invention has a thinner design than conventional devices, wherein a first functional layer such as a liquid crystal layer and a second functional layer such as a transparent resin layer are sandwiched between two substrates in a state of mutual detachment by a seal material so as not to overlap each other. Further, the process for producing the liquid crystal display device according to the present invention can be achieved with simple process.

BRIEF DESCRIPTION OF THE DRAWINGS

FIG. 5: a plan view showing an example of a seal material after it is applied.

FIGS. 6(a) to 6(d): cross-sectional views along a IV-IV' line, showing an embodiment of the production process of the present invention.

FIGS. 10(a) and 10(c): plan views showing another embodiment of the present invention.

FIG. 10(b): a cross-sectional view along a X-X' line of another embodiment of the present invention.

EXPLANATION OF NUMERALS

| | |
|---|---|
| 10, 10a: | Liquid crystal display device |
| 11, 12: | Substrate |
| 13, 14: | Seal material |
| 13a: | Edge portion |
| 15, 16, 15a, 16a: | Terminal |
| 17, 18: | Wiring |
| 31: | Transparent resin layer |
| 32: | Composite layer |
| 41, 42: | Transparent electrode |
| 43: | Spacer |
| 100: | Vacuum laminating apparatus |
| 101: | Vacuum chamber |
| 102: | Electrostatic chuck |
| 103: | Surface plate |
| 200: | Drive unit |

BEST MODE FOR CARRYING OUT THE INVENTION

Next, embodiments of the present invention will be described. However, the present invention is not limited to the following embodiments. Further, every drawing is shown schematically, and may include a simplified part or differently-scaled part from a real thing.

Figure 1A:
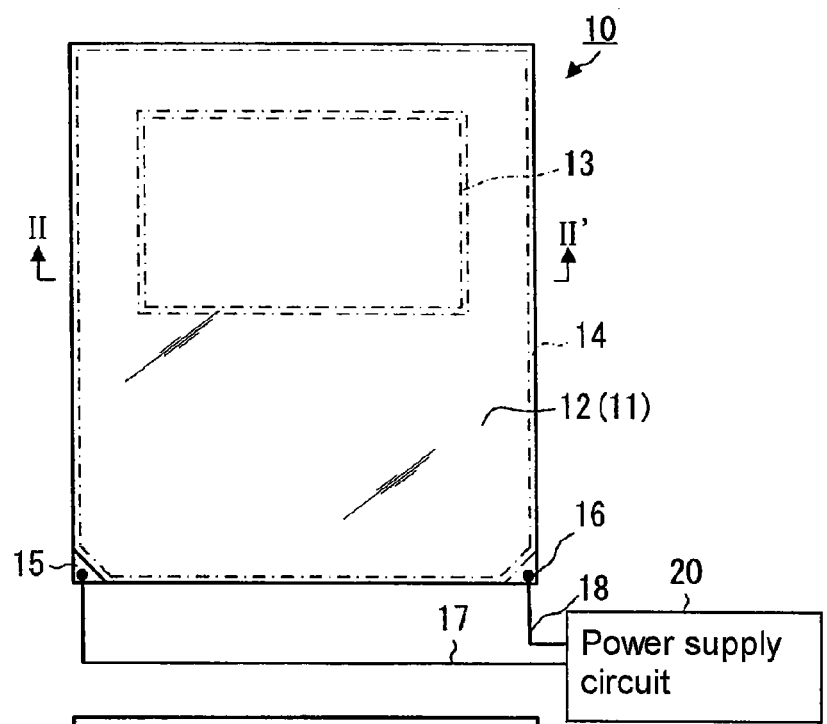
FIGS. 1(a) and 1(b): plan views showing an embodiment of the present invention.
Figure 1B:
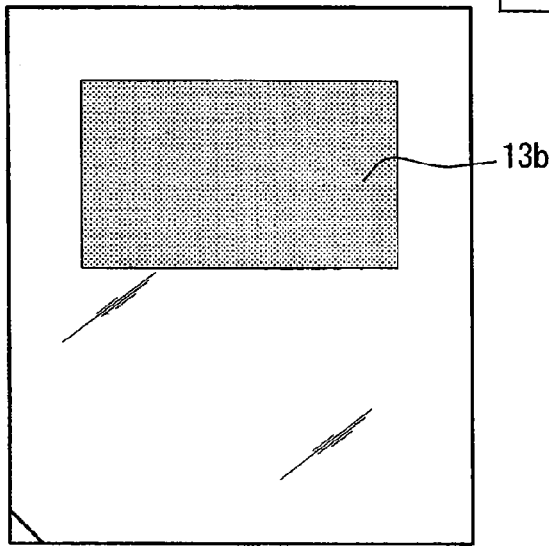
Figure 2:
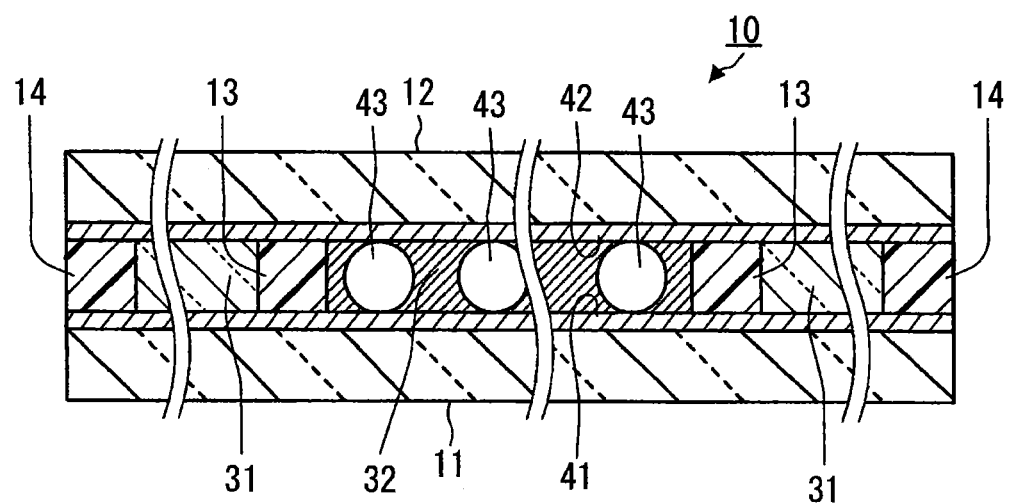
FIG. 2: a cross-sectional view schematically showing a cross-section along a II-IP line.

FIGS. 1(a) and 1(b) are plan views showing an embodiment of the present invention. FIG. 2 is a cross-sectional view schematically showing a cross-section along a II-II' line of FIG. 1(a). The liquid crystal display device 10 has a first transparent substrate 11, a first transparent electrode 41, a second transparent substrate 12, a second transparent electrode 42, a first seal material 13, a second seal material 14, spacers 43, a transparent resin layer 31 and a composite layer 32.

As shown in FIG. 2, on opposing surfaces of the transparent substrates 11 and 12, transparent electrodes 41 and 42 are formed so as to cover entire respective surfaces. In four corners of the transparent substrates, the transparent substrates are partially cut off so that the transparent electrodes 41 and 42 are exposed to configure terminals 15 and 16 respectively.

The terminals 15 and 16 are connected to a power supply circuit 20 via wirings 17 and 18 respectively.

Here, transparent electrodes 41 and 42 may be provided on a part of the transparent substrates 11 and 12.

Further, the transparent resin layer 31 and the composite layer 32 comprising a composite of liquid crystal and cured product, are sandwiched between the first transparent substrate 11 and the second transparent substrate 12. The first seal material 13 has a ring shape when the liquid crystal display device 10 is observed from the front side, and the inside of the ring is filled with the composite layer 32 without gap. A partitioned region between the first seal material 13 and the second seal material 14 is filled with the transparent resin layer 31 without gap. Accordingly, only a region 13b surrounded by the first seal material 13 has a display function (transparent state/non-transparent state is switched depending on application of voltage) by a liquid crystal, and other regions remain transparent at any time irrespective of voltage application. The seal materials 13, 14 are preferably made of a transparent resin from the viewpoint of design, but they may be made of a colored resin depending on their application. Similarly, the transparent resin layer 31 may be made of the same material as the seal materials 13, 14.

The first and second transparent substrates 11 and 12 are electrically insulating transparent substrates, and they may, for example, be glass substrates, resin substrates such as polycarbonate or acrylic, or resin films. The first transparent substrate 11 shown in FIGS. 1(a) and 1(b) has substantially the same size as the second transparent substrate 12, but they may be different from each other. Further, between the first transparent substrate 11 and the second transparent substrate 12, a plurality of regions each surrounded by a ring-shaped seal material may be provided.

The first and second transparent electrodes 41 and 42 may, for example, be made of ITO (indium tin oxide). The shape of a region 13b surrounded by the first seal material 13 when the liquid crystal display device 10 is observed from the front side, is not limited to a rectangle, but it may be a circle, a triangle or a shape such as specific mark, character or letter.

Further, on each of the first and second transparent electrodes 41 and 42, an alignment film (not shown) is formed. The alignment film contacts with the composite layer 32 so as to align liquid crystal molecules contained in the composite layer 32 in a predetermined direction. Further, between the transparent electrode and the alignment film, an insulating thin film such as metal oxide may be provided to improve electrical insulation properties. Meanwhile, a configuration without alignment film may be acceptable depending on the type of the liquid crystal or the composite layer.

The first seal material 13, the second seal material 14 and the transparent resin layer 31 are made of, for instance, UV-curable resin (hereinafter referred to as UV resin) or a thermosetting resin. Spacers 43 are uniformly distributed in a space enclosed by the first and second substrates 11 and 12 and the first seal material 13. Though the spacers 43 are employed to control a cell gap in the composite layer 32, the spacers 43 may be distributed in the transparent resin layer 31. The cell gap, that is the diameter of each spacer 43, is preferably from 2 to 50 μm, more preferably from 4 to 30 μm. If the cell gap is too small, contrast of display decreases, and if the cell gap is too large, driving voltage increases. The spacers 43 are made of a hard material such as glass particles, silica particles or crosslinked acrylic particles. Meanwhile, instead of spherical spacers, rib-shaped or fiber-shaped spacers may be formed on one of the substrates.

Further, the seal material being transparent after curing may, for example, be a polymer of epoxy system, acrylic system, urethane system or polyene-polythiol system, or a mixed system of these. Thermosetting type or photocurable type material is employed for the seal material. Particularly, a polyene-polythiol system polymer is preferred, and it can achieve a visible light transmittance of at least 70%. Further, by dropping a raw material for transparent resin comprising a polyene-polythiol system polymer in a region surrounded by the seal materials 13 and 14, it is possible to make the visible light transmittance of the transparent resin layer to be 70%.

Here, the visible light transmittance in this explanation is measured by SPECTRO MULTI CHANNEL PHOTO DETECTOR (MCPD-10000) manufactured by Otsuka Electronics Co., Ltd. Further, the haze value is measured by direct-read haze computer HGM-2, manufactured by Suga Test Instruments Co., Ltd.

A specific example of the seal material is as follows. Tris-2-hydroxyethyl isocyanurate-tris-3-mercapto propionate (molecular weight: 526) and triallyl isocyanurate (molecular weight: 250) are mixed at a ratio of [tris-2-hydroxyethyl isocyanurate-tris-3-mercapto propionate:triallyl isocyanurate=2.1:1 (mass ratio)]. Further, 1 wt % of photopolymerization initiator (benzoine isopropyl ether) for the total amount of the above two monomers is added. They are stirred well, and 0.3 wt % of glass spacers (gap diameter: 6 μm) are added against the total weight, they are further stirred to form a seal material in which the glass spacers are uniformly distributed, and the seal material obtained may be used as the seal material 13 and 14.

Meanwhile, a seal material having a visible light transmittance of less than 70% may be as follows.

To World lock No. 717 (epoxy resin compound manufactured by Kyoritsu Chemical & Co., Ltd.), 0.3 wt % of glass spacers (gap diameter: 6 μm) are added, they are stirred to form a material in which glass spacers are uniformly distributed, and it may be used as the seal material 13 and 14.

Further, to Stretbond S-45 (manufactured by Mitsui Chemicals, Inc.), 0.3 wt % of glass spacers (gap diameter: 6 μm) are added, they are stirred to form a material in which glass spacers are uniformly formed, and it may be used as the seal material 13 and 14.

The composite layer 32 is sealed in a space enclosed by the first and second transparent substrates 11 and 12 and the seal material 13. The composite layer 32 comprises a mixture of liquid crystal and cured product. Specific components will be described later. Since the liquid crystal is vertically aligned and has a domain structure, the incident light into the composite layer 32 is scattered at a time of voltage application. Accordingly, hereinafter, the region in which the composite layer 32 is formed when the liquid crystal display device 10 is observed from the front side is referred to as a scattering display area. The scattering display area is in transparent state at a time of no voltage application, and the transmittance changes with the voltage application to be scattering state.

The liquid crystal employed in the composite layer 32 may, for example, be a nematic liquid crystal that is a material of electric field drive type. It may be a combination of two or more kinds of liquid crystals. Further, for the purpose of an electric-field control display, a liquid crystal having a negative dielectric anisotropy is preferably employed since the transmittance in a transparent state can be increased by vertically aligning the liquid crystal, but positive/negative of a dielectric anisotropy can be appropriately selected. Further, in order to reduce the driving voltage, dielectric anisotropy is preferably high.

The composite layer 32 to be employed for the liquid crystal display device 10 according to an embodiment of the present invention, is preferably a composite layer obtained by polymerizing curing of a composite material containing at least a curable compound and the said non polymerizable liquid crystal, wherein the curable compound contains one or more kinds of bifunctional polymerizable compound (A) represented by the following formula (1) and one or more kinds of bifunctional polymerizable compound (B) represented by the following formula (2). When the composite layer 32 has such a composition, the visible light transmittance of the composite layer 32 can be at least 70%. Further, by comprising the seal material by a polyene-polythiol system polymer, it is possible to make the absolute value of the difference between the haze value of the seal material and the haze value of the composite layer in the transparent state, to be at most 3%.

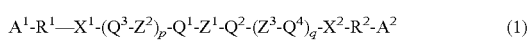

(1)

(2)

Bifunctional polymerizable compound (A) is a component for forming a rigid backbone in the composite. Meanwhile, the bifunctional polymerizable compound (B) is a component for forming a flexible portion which can play a role of shock absorption in the composite. By combining such compounds having different physical properties, a composite layer 32 of liquid crystal and cured product suitable for the liquid crystal display device 10 of the present invention is obtained. Of course the curable compound (polymerizable compound) for forming cured product is not limited thereto.

The bifunctional polymerizable compound (A) is a compound having a mesogenic structure, and among compounds represented by the formula (1), ones having the following first to third embodiments are preferred. An embodiment for carrying out the present invention is preferably the first embodiment, more preferably the second embodiment than the first embodiment, still more preferably the third embodiment than the second embodiment.

First Embodiment of Bifunctional Polymerizable Compound (A)

In the first embodiment, symbols in formula (1) have the following meanings.

$A^1$, $A^2$ are each independently an acryloyloxy group, a methacryloyloxy group or a vinyl ether group.

$Q^1$, $Q^2$, $Q^3$ and $Q^4$ are each independently a 1,4-phenylene group or a 1,4-cyclohexylene group that may have a substituent group.

$X^1$ and $X^2$ are each independently a single bond, an oxygen atom or an ester bond.

$R^1$ and $R^2$ are each independently a single bond or a linear or branched alkylene group containing 2 to 20 carbon atoms that may have one or a plurality of ethereal oxygen atoms between carbon atoms.

$Z^1$, $Z^2$ and $Z^3$ are each independently a single bond, —C(=O)—O—, —O—C(=O)—, —CH$_2$—CH$_2$—, —C≡C—, —CH$_2$—O— or O—CH$_2$—.

p and q are both 0 or one of them is 0 and the other is 1.

Second Embodiment of Bifunctional Polymerizable Compound (A)

In the second embodiment, symbols in formula (1) have the following meanings.

$A^1$ and $A^2$ are each independently an acryloyloxy group or a methacryloyloxy group.

$Q^1$ and $Q^2$ are each 1,4-phenylene group that may have a substituent group, and $Q^3$ and $Q^4$ are each independently a 1,4-phenylene group or a 1,4-cyclohexylene group that may have a substituent group.

$X^1$, $X^2$, $R^1$ and $R^2$ have the same meanings as those described above.

$Z^1$, $Z^2$ and $Z^3$ are each independently a single bond, —C(O)—O—, —O—C(=O)—, —CH$_2$—CH$_2$— or C≡C—.

p and q are both 0 or one of them is 0 and the other is 1.

Third Embodiment of Bifunctional Polymerizable Compound (A)

In the third embodiment, symbols in formula (1) have the following meanings.

$A^1$ and $A^2$ are both acryloyloxy groups.

$Q^1$ and $Q^2$ are both 1,4-phenylene groups that may have a substituent group, and $Q^3$ and $Q^4$ are each independently a 1,4-phenylene group or a 1,4-cyclohexylene group that may have a substituent group.

$X^1$ and $X^2$ have the same meanings as those described above.

$R^1$ and $R^2$ are each independently a linear or branched alkylene group containing from 2 to 20 carbon atoms.

$Z^1$ is a single bond, —C(=O)—O—, —O—C(=O)—, —CH$_2$—CH$_2$— or C≡C—, and $Z^2$ and $Z^3$ are each a single bond.

p and q are both 0 or one of them is 0 and the other is 1.

A specific example of the bifunctional polymerizable compound (A) may be a compound of the following formula (3).

(3)

The bifunctional polymerizable compound (A) may be a liquid crystalline compound, or it may be a non-liquid crystalline compound. The bifunctional polymerizable compound (A) may be only a non-liquid crystalline bifunctional polymerizable compound (A), only a liquid crystalline bifunctional polymerizable compound (A), or a combination of the non-liquid crystalline bifunctional polymerizable compound (A) and the liquid crystalline bifunctional polymerizable compound (A).

The bifunctional polymerizable compound (B) is a compound having no mesogenic structure, and is preferably a compound represented by the following formula (2).

$$A^3\text{-}R^3\text{-}A^4 \quad (2)$$

$A^3$ and $A^4$ are each independently an acryloyloxy group, a methacryloyloxy group or a vinyl ether group.

$R^3$ is —$R^4$— or —($R^5$—O)$_n$—$R^5$—.

Note that $R^4$ and $R^5$ have the meaning of following (i) or (ii), preferably (i), more preferably (ii).

(i) $R^4$ is a linear or branched alkylene group containing from 2 to 20 carbon atoms, $R^5$ is a linear or branched alkylene group containing from 2 to 8 carbon atoms, and n is an integer chosen from 1 to 10.

(ii) $R^4$ is a linear alkylene group containing from 2 to 20 carbon atoms, and $R^5$ is —(CH$_2$)$_r$—, —CH$_2$—CH(CH$_3$)—, —CH$_2$—CH$_2$—CH(CH$_3$)— or —CH$_2$—CH$_2$—C(CH$_3$)$_2$— wherein r is an integer chosen from 2 to 5, and n is an integer chosen from 1 to 10. The bifunctional polymerizable compound (B) may be used alone, or two or more kinds of such compounds may be used in combination. The bifunctional polymerizable compound (B) may, for example, be a compound represented by the following formula (4).

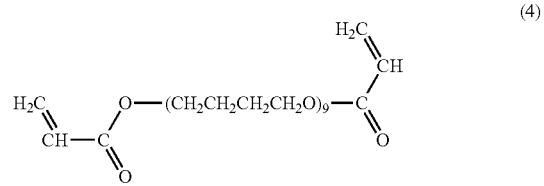

(4)

The bifunctional polymerizable compound (B) has polymerizable groups $A^3$ and $A^4$ and a divalent group $R^3$ connecting the said polymerizable groups $A^3$ and $A^4$. It is preferably for $R^3$ to select a group having a moiety where atoms constituting $R^3$ are connected by a single bond with each other and thus having high degree of the rotational freedom in the molecule. By such a configuration, it is possible to improve flexibility of cured product obtained through curing reaction. Further, it is possible to make polymerization phase separation progress smoothly.

As the number of carbon atoms and ethereal oxygen atoms of the group R3 present between $A^3$ and $A^4$ increases, flexibility of the cured product obtained after curing improves. On the other hand, as the number of these atoms increases, compatibility with liquid crystal at a time of preparing the composite material decreases. Further, in a case of employing an ODF (one drop fill) method, considering volatility, the number of carbon atoms of the bifunctional polymerizable compound (B) is at least 8, preferably at least 11. It is preferred to select the structure (number of atoms and type of constituent atoms) of the group R3 with all things considered.

The group $R^3$ may contain ethereal oxygen atom(s) or it may contain no such oxygen atom. When $R^3$ contains ethereal oxygen atom(s), flexibility of the cured product improves, such being preferred.

Since the bifunctional polymerizable compound (B) contains no group (cyclic group) such as Q1 in the molecule, it is relatively easy to increase the number of carbon atoms contained in R3 without significantly increasing the number of carbon atoms contained in the entire compound. By employing this structure, it is possible to significantly improve flexibility of a composite layer obtained by curing the curable compound from a composite material, while compatibility with liquid crystal is maintained. In the present invention, the composite material may contain a polymerization initiator for initializing curing of a curable compound or a curing promoter (such as curing catalyst) for promoting curing. Particularly, the polymerization initiator is preferably employed. Such a polymerization initiator may be appropriately selected from known polymerization catalysts. For example, in a case of employing a photopolymerization phase separation method, a common photopolymerization initiator of such as benzoin ether system, acetophenone system or phosphine oxide system, may be employed.

Further, in order to improve contrast ratio or stability, various compounds may be added to the composite material. For example, in order to improve contrast, various kinds of dichroic dyes such as those of anthraquinone system, styryl system, azomethine system or azo system may be employed. In this case, the dichroic dye is basically preferably soluble to the liquid crystal compound, and preferably insoluble to the curable compound. Besides these, an antioxidant, a UV-absorbing agent or various kinds of plasticizers are preferably added for the purpose of improving stability or durability.

Next, operation of the above-described liquid crystal display device 10 will be described.

When a voltage is applied between the first and second transparent electrodes 41 and 42, liquid crystal molecules are randomly oriented by electric field between the electrodes, whereby the composite layer 32 becomes a scattering state. On the other hand, when no voltage is applied between the first and second transparent electrodes 41 and 42, the liquid crystal molecules are aligned, whereby the composite layer 32 becomes a transparent state. The composite layer 32 in the transparent state enables an observer to observe a view through a back side (a surface on the other side from the position of observer) of the liquid crystal display device 10.

Meanwhile, the liquid crystal display device may be one being in a transparent state at a time of voltage application and a scattering state at a time of non-voltage application. However, in a case of automobile use, from the viewpoint of fail safe, the device is preferably one being in a scattering state at a time of voltage application and a transparent state at a time of non-voltage application.

Figure 3A:
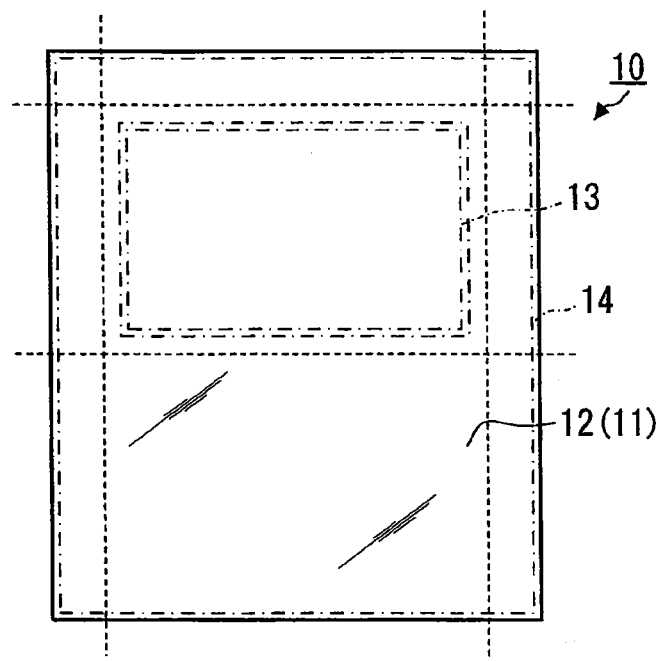
FIGS. 3(a) to 3(c): a plan view showing another embodiment of the present invention.
Figure 3B:
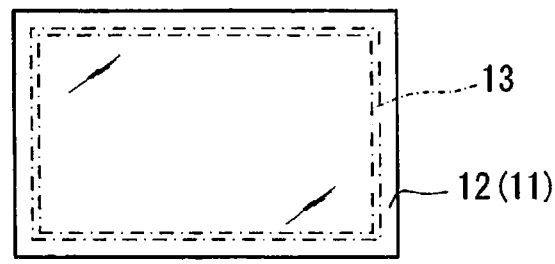
Figure 3C:
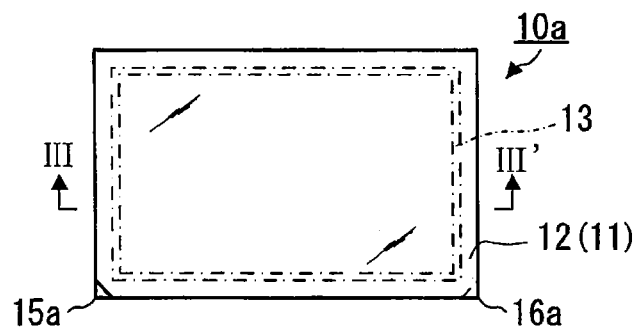
Figure 3D:
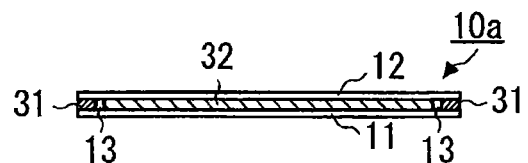
FIG. 3(d): a cross-sectional view along a III-III' line.

Next, FIGS. 3(a) to 3(d) show another embodiment of the present invention. As shown in FIG. 3(a), a liquid crystal display device 10 is produced in the same manner as FIG. 1(a), and the device is cut by a dicer along a broken line in the Figure to produce a structure shown in FIG. 3(b). Subsequently, a part of four corners of the substrates are cut off to form terminals 15a and 16b, to thereby produce a small-sized liquid crystal display device 10a shown in FIG. 3(c). In this embodiment, the seal material 13 is preferably made of a transparent resin, but the seal material 14 may be made of commonly used colored resin since it is removed in a subsequent step. The transparent resin layer 31 may be made of a colored resin according to application of the device. In each side of the rectangular liquid crystal display device 10a, the transparent resin layer 31 is exposed (FIG. 3(d)).

Next, a process for producing the liquid crystal display device 10 of the present invention will be described.

Figure 4:
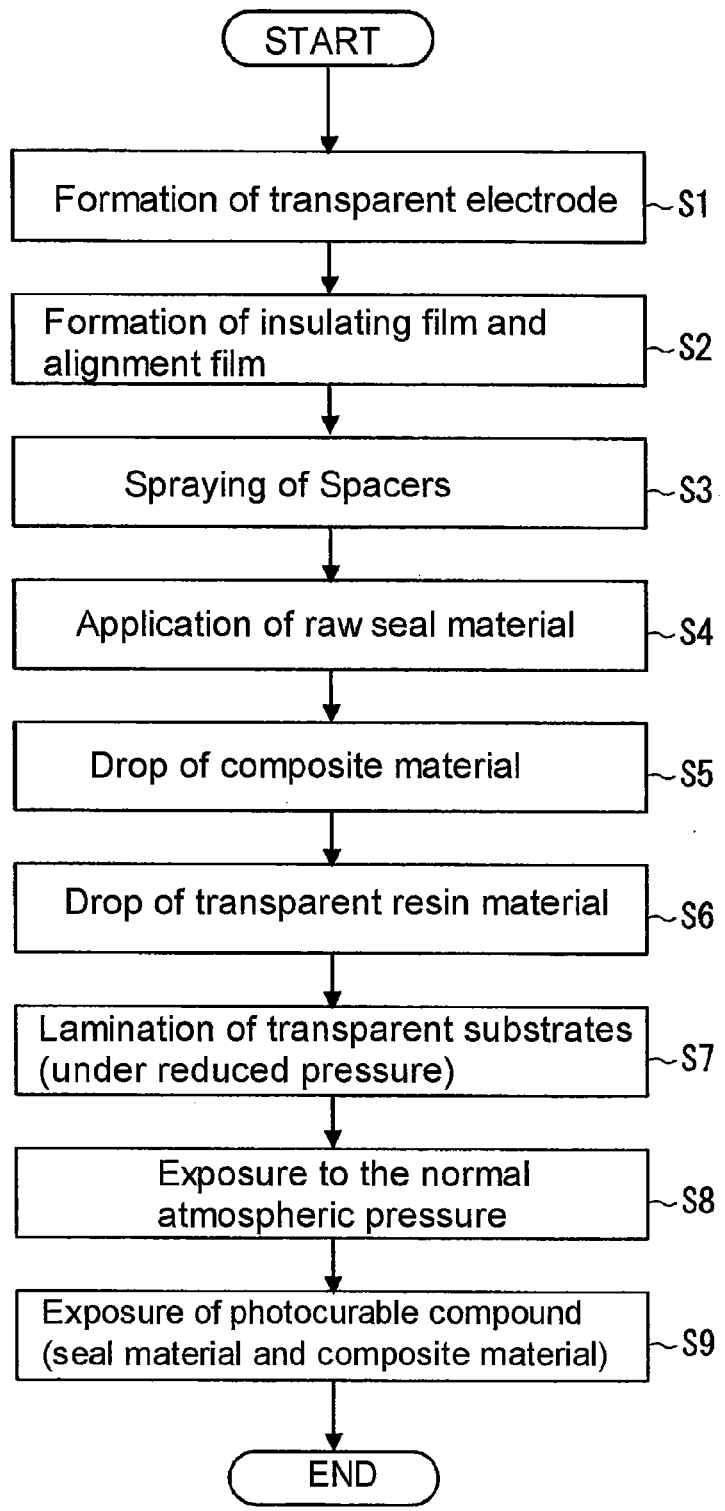
FIG. 4: a flow chart showing an embodiment of the production process of the present invention.
Figure 7:
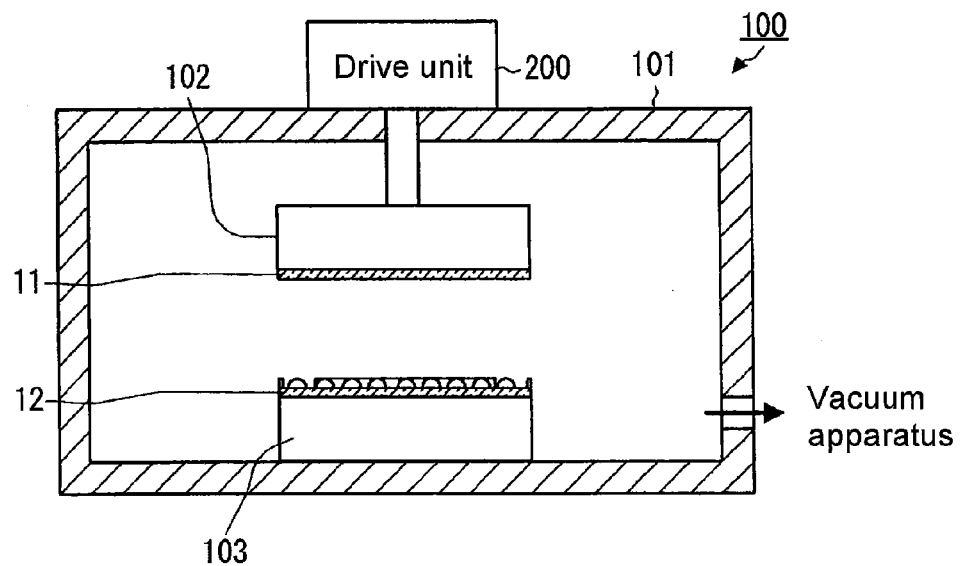
FIG. 7: an explanation view showing an embodiment of the production equipment of the present invention.

FIG. 4 is a flow chart showing an embodiment of the production process of the present invention. FIG. 5 is a plan view showing an embodiment of a seal material after it is applied. FIG. 6 is a cross-sectional view showing an embodiment of the production process of the present invention. FIG. 7 is an explanation view showing an embodiment of a production apparatus of the present invention.

First, on one surface of each of the first and second transparent substrates 11 and 12, a transparent electrode film for forming a first or second transparent electrodes 41 or 42, is formed by such as a sputtering method or a vacuum evaporation method (step S1). The transparent electrode film is preferably ITO. Thereafter, the transparent electrode film may be patterned by a photolithography method and by etching, but in this embodiment, these methods are not used and as shown in FIG. 2, a so-called full-surface electrode formed to cover entire region of one surface of each substrate, is employed.

Next, on each of surfaces of the first and second transparent substrates 11 and 12 on which a transparent electrode is formed, an alignment film (not shown) is formed (step S2). The alignment film is formed so that it contacts with the composite layer 32 so as to align liquid crystal molecules contained in the composite layer in a predetermined direction.

As described above, among alignment films formed on the transparent substrates 11 and 12, at least one alignment film is formed so as to align liquid crystal molecules vertically against the surfaces of the transparent substrates 11 and 12. Meanwhile, the alignment film on the transparent substrate 11 may be formed only in a region facing to the transparent substrate 12. Further, between the transparent electrode and the alignment film, an insulating film of such as metal oxide may be provided for the purpose of improving electrical insulation properties.

Next, on the opposed surfaces of the first and second transparent substrates 11 and 12, spacers 43 are sprayed by a sprayer (step S3).

Next, on the opposed surfaces of the first transparent substrate 11 and second transparent substrate 12, the first raw seal material 13a and the second raw seal material 14a which are uncured are applied (step S4; FIG. 6(a)). For raw seal materials 13a and 14a, such as a UV curable resin or a thermosetting resin may be employed. Meanwhile, the raw seal materials may be applied at a plurality of locations so as to form a plurality of ring-shaped regions to thereby form a plurality of kinds of liquid crystal layers and resin layers.

Next, inside a ring-shaped raw seal material 13a applied on the first or the second transparent substrate 11 or 12, a composite material 32a being a first functional material comprising a mixture of a nematic liquid crystal and an uncured curable compound (photocurable compound), is dropped (step S5). Subsequently, in a region surrounded by the first raw seal material 13a and the second raw seal material 14a, a transparent resin material 31a being a second functional material is dropped (step S6; FIG. 6(b)). FIG. 5 shows an example of the transparent substrate 11 on which the transparent resin material 31a and the composite material 32a are dropped.

Next, in a vacuum chamber 101 of a vacuum laminating apparatus 100 shown in FIG. 7, the transparent substrates 11 and 12 are placed. The transparent substrate 11 is placed on a surface plate 103, and the transparent substrate 12 is fixed and held by an electrostatic chuck 102 that is movable up and down by a drive unit 200. Thereafter, inside the vacuum chamber 101 is evacuated by a vacuum apparatus to make it in a predetermined reduced pressure state, and then, the electrostatic chuck 102 is moved down so that the first and second transparent substrates 11 and 12 are laminated through the raw seal material 31a and the composite material 32a (step S7; FIG. 6(c)). Subsequently, air is introduced into the vacuum chamber 101 so that the transparent substrates 11 and 12 etc. are exposed to a normal atmospheric pressure (step S8). By this step, a space enclosed by the first and second transparent substrates 11 and 12, the seal material 13 and the seal material 14, becomes substantially a closed space, and a composite material or a transparent resin material (optical bonding resin) is injected into the closed space. For the above steps, so-called ODF (one drop fill) method is applied.

Next, the raw seal materials 13a and 14a, uncured photocurable compound in the composite material 32a, and a transparent resin material 31a, are exposed to be cured with such as a UV light source (step S9; FIG. 6(d)). By the exposure, the photocurable compound is cured and a composite layer of liquid crystal and cured product, is formed. If the raw seal materials 13a and 14a and the transparent resin material 31a are not photocurable compounds, curing of the raw seal materials 13a and 14a and the transparent resin material 31a needs to be carried out by such as heating separately.

Next, another embodiment of the present invention will be described.

Figure 8:
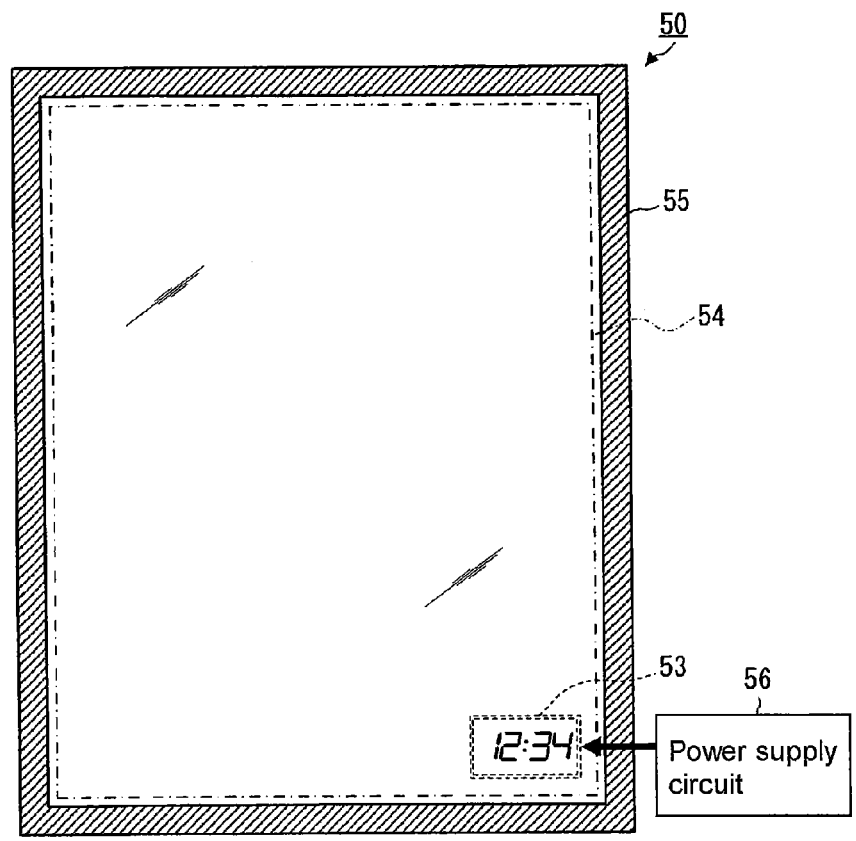
FIG. 8: a plan view showing another embodiment of the present invention.

FIG. 8 is a plan view showing another embodiment of the present invention. A liquid crystal display device 50 has the same configuration as that shown in FIGS. 1 and 2 except that a region of an electrode surrounded by a seal material 53 is patterned, and that 4-digit numbers and a colon symbol are each displayed independently. Display control is carried out by a power supply circuit 56 connected with each electrode pattern. Further, the composite layer is formed only in a partial area surrounded by the seal material 53, and a transparent resin is sealed in a region surrounded by the seal materials 54 and 53. The periphery of the transparent substrates is held with a frame 55 made of a metal such as aluminum so that the liquid crystal display device 50 is usable as an opening member such as a building window. On one or both surfaces of the liquid crystal display device 50, a reinforcing glass plate may be bonded through an intermediate film made of such as PVB or EVA. This glass plate may, for example, be a heat reflecting glass or a tempered glass.

Further, the present invention realizes the following embodiment.

Figure 9A:
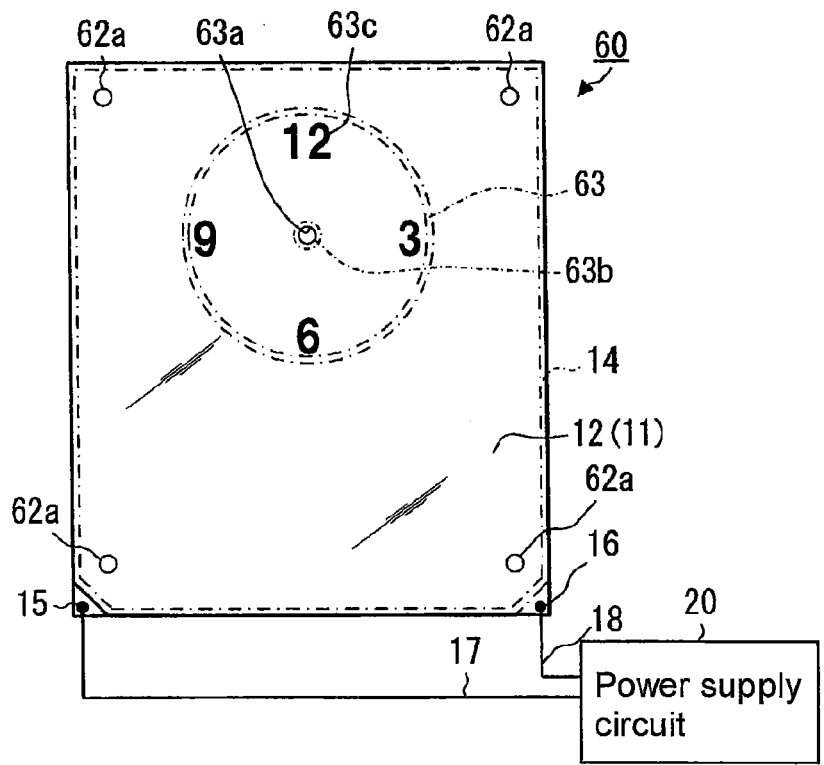
FIGS. 9(a) and 9(b): plan views showing another embodiment of the present invention.

As shown in FIG. 9(a), a liquid crystal display device 60 has the same configuration as that shown in FIG. 1 but differs in that the shape of a seal material 63 for forming a composite layer is circular, and that the device has through holes 62a and 63d.

In a region surrounded by a seal material 64, a transparent resin is sealed and four through holes 62a are provided. These through holes are opened after the transparent resin is cured. Further, in a region surrounded by the seal material 63 and filled with a composite material sealed, a through hole 63a is provided. By creating a circular region surrounded by a seal material 63b beforehand, it is possible to prevent a composite layer from leaking out even if the through hole 63a is opened after the transparent substrates are bonded together. Further, on a surface of a transparent substrate 12 (positioning on front side of the Figure) configuring the liquid crystal display device 60, characters 63c can be formed by printing or pasting a seal.

Figure 9B:
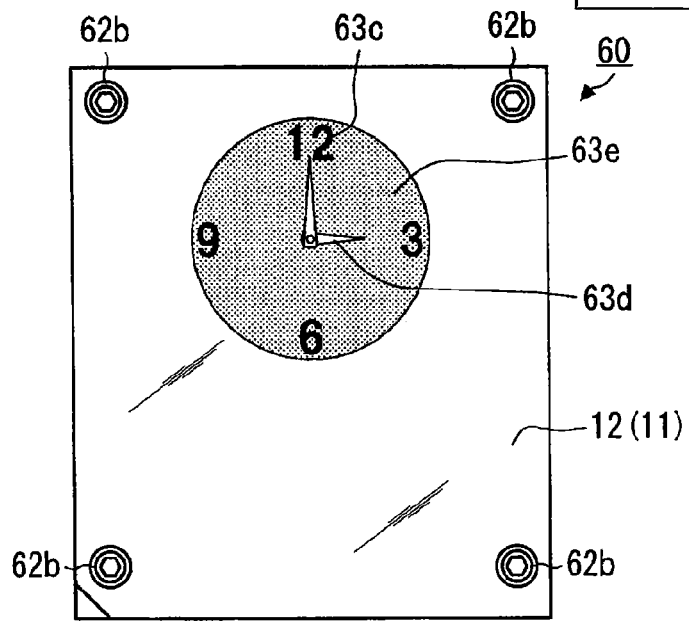

As shown in FIG. 9(b), bolts 62b may be inserted into the through holes 62a to fix the liquid crystal display device 60 on such as a wall face. Into a through hole 63a, a rotational axis for long hand and short hand of clock is inserted, whereby the liquid crystal display device can be used as a clock having an excellent design. A drive unit (not shown) of the clock is disposed on a rear side of the transparent substrate 11 (positioning on a rear side of the Figure), and voltage is applied to the terminals 15 and 16, whereby a composite layer provided in a region 63e surrounded by the seal material 63 becomes non-transparent.

By employing a mirror or a colored substrate instead of the transparent substrate 11, it is possible to produce a clock having an excellent design.

As shown in FIG. 10(a), a plurality of regions each surrounded by a seal material 73 may be provided in a region surrounded by the seal material 14. By injecting a composite into the regions each surrounded by the seal material 73, a plurality of circular patterns arranged in a matrix form can be displayed. Further, by providing light-emitting diode chips 701 on a rear side of the transparent substrate 11 (positioning on rear side of the Figure) so as to correspond to the circular patterns, it is possible to realize light-emitting circular patterns. Namely, each diode chip is substantially a point light source, but by making the composite layer in the region 73a a scattering state (FIG. 10(c)), light emitted from each light-emitting diode chip is scattered. As a result, it is possible to illuminate entirety of each region 73a. Each light-emitting diode 701 is connected to a power supply circuit 702 through such as a transparent wiring 703 of ITO formed on rear surface of a transparent substrate 71, for instance. Here, the light-emitting diode 701 may be embedded in a laminated glass, and the laminated glass may be employed instead of the transparent substrate 11.

Figure 11:
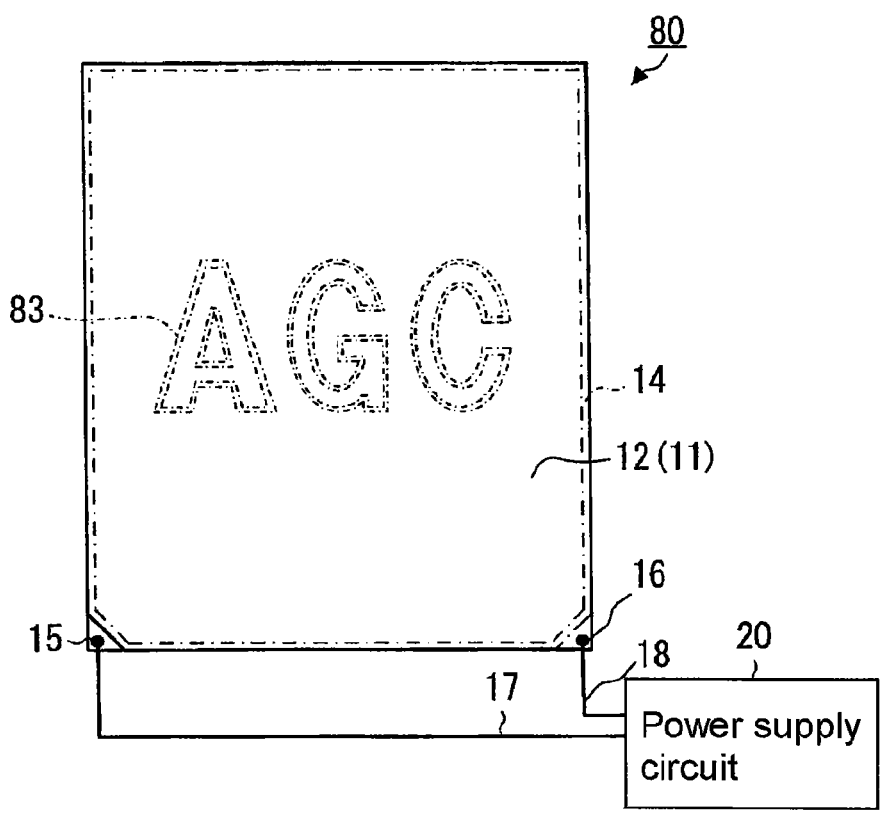
FIG. 11: a plan view showing another embodiment of the present invention.

Finally, FIG. 11 shows a liquid crystal display device 80 having the same configuration as that shown in FIG. 1 except that seal materials 83 for forming composite layers are laid out to display characters of AGC. By this configuration, it is possible to display such as characters without patterning electrodes.

As described above, in the liquid crystal display device according to the present invention, only a partial area in the transparent substrates 11 and 12 requiring liquid crystal displaying needs to be filled with expensive liquid crystal material. Graphics, symbols and characters can be displayed without patterning ITO electrodes. The liquid crystal panel can be produced with low cost.

Meanwhile, in the above description, a liquid crystal and cured product composite device is explained, but the present invention is not limited thereto. The present invention can be applied to a normal liquid crystal display device only having liquid crystal. In the same manner as the case of liquid crystal and cured product composite device, it is possible to provide a liquid crystal display device of lower cost than before, which can perform a liquid crystal display only in a partial area. Further, explanation has been made with respect to a passive type liquid crystal display device, but besides this, the present invention can be applied to liquid crystal display devices of other driving methods such as those of static or active.

EXAMPLE

Next, an example of the present invention will be described.

On each of ITO electrodes as transparent electrodes made of ITO thin film (indium tin oxide) formed on opposed surfaces of a pair of glass substrates, a $SiO_2$—$TiO_2$ system metal oxide thin film (MIC-55 manufactured by AGC SEIMI CHEMICAL CO., LTD.) was formed as an insulating layer. Further, on the metal oxide thin film, an alignment film being a polyimide thin film having a pretilt angle of about 90° was formed. On one of the pair of glass substrates on which films are thus formed, spacers (Micropearl KH, 10.5 μm, manufactured by SEKISUI CHEMICAL CO., LTD.) were sprayed, and they were subjected to a heat treatment at 110° C. for 10 minuets to be fixed onto the substrate.

Next, a UV curable adhesive agent (OP-2070, viscosity 700,000 mPa·s, refractive index 1.55, manufactured by Denki Kagaku Kogyo Kabushiki Kaisha) was applied by a dispenser along the outer periphery of the substrates while the adhesive agent was warmed up to 50° C. The adhesive agent was further applied on the substrate surface to form a shape in which liquid crystal drive was desired. Next, inside the seal material having a shape in which liquid crystal driving was desired, a composite of liquid crystal having negative dielectric anisotropy and a curable compound, was dropped in a predetermined amount calculated from the area and a gap between the substrates.

Next, on other area, a UV-curable adhesive agent (No. 68, viscosity 2,500 mPa·s, refractive index 1.56, manufactured by NORLAND PRODUCTS INC.) was dropped in a predetermined amount calculated from the area and a gap between the substrates in the same manner. The glass substrate on which the liquid crystal is dropped was laminated with another glass substrate to be opposed thereto in a vacuum laminating apparatus for producing liquid crystal panel. Next, at a room temperature, both surfaces of the laminated substrates were irradiated with UV rays having a central wavelength of 365 nm and an irradiation intensity of 30 W/m$^2$ for 10 minutes, to cure the curable compound to thereby obtain a liquid crystal display device.

Entire panel of the liquid crystal display device obtained was transparent at a time of non-voltage application, and only an area having a shape in which drive is desired was able to be changed to cloudy state of scattering by applying a voltage.

Industrial Applicability

As described above, the present invention enables to have a display function only in a partial area of the substrate, and provides a merit that it requires only a little amount of liquid crystal material. Further, the present invention is suitably applicable to an automobile having a display function or a building window glass.

The entire disclosure of Japanese Patent Application No. 2006-305361 filed on Nov. 10, 2006 including specification, claims, drawings and summary is incorporated herein by reference in its entirety.

What is claimed is:

1. A liquid crystal display device, comprising first and second substrates that are disposed so as to oppose each other and each having a transparent electrode;
   a first seal material for forming a first space between the first and second substrates;
   a second seal material for forming a second space between the first and second substrates;
   a composite layer positioned in the first space and containing liquid crystal and a cured product; and
   a transparent resin layer provided in the second space and containing no liquid crystal;
   wherein the composite layer and the first and second seal materials each has a visible light transmittance of at least 70% in a transparent state;
   the second space enclosed by the first and second substrates and the first and second seal materials is filled with the transparent resin layer without gap; and
   wherein the second space is larger than the first space.

2. The liquid crystal display device according to claim 1, wherein the seal material comprises a polyene-polythiol system polymer.

3. The liquid crystal display device according to claim 1, wherein an absolute value of the difference between a haze value of the first and second seal materials and a haze value of the composite layer in a transparent state is at most 3%.

4. The liquid crystal display device according to claim 1, wherein the composite layer shows a scattering state at a time of voltage application and the composite layer shows a transparent state at a time of no voltage application.

5. The liquid crystal display device according to claim 4, wherein the transparent resin layer has a visible light transmittance of at least 70%, and
   at a time of no voltage application, the composite layer shows a transparent state and the entire liquid crystal display device becomes transparent.

6. The liquid crystal display device according to claim 1, wherein the transparent resin layer, the first seal material, and the second seal material comprise a UV curable resin.

7. The liquid crystal display device according to claim 1, wherein the transparent resin layer, the first seal material and the second seal material comprise a thermosetting resin.

* * * * *